US010343576B1

(12) United States Patent
Ortega Rojo et al.

(10) Patent No.: US 10,343,576 B1
(45) Date of Patent: Jul. 9, 2019

(54) ADJUSTABLE CUP HOLDER FOR HOLDING TALL CUPS, BOTTLES AND THE LIKE

(71) Applicant: FORD GLOBAL TECHNOLOGIES, LLC, Dearborn, MI (US)

(72) Inventors: Adriana Cecilia Ortega Rojo, Ciudad de Mexico (MX); Carolina Amaya Pimentel, México City (MX); Nathali Vasquez Henao, Ciudad de Mexico (MX); Alejandra Rivas Franco, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/876,951

(22) Filed: Jan. 22, 2018

(51) Int. Cl.
B60N 3/10 (2006.01)
A47G 23/02 (2006.01)
B60R 11/00 (2006.01)

(52) U.S. Cl.
CPC ......... B60N 3/105 (2013.01); A47G 23/0208 (2013.01); B60R 2011/008 (2013.01); B60R 2011/0075 (2013.01)

(58) Field of Classification Search
CPC .................................................... B60N 3/102
USPC ....... 248/311.2, 685, 146, 147, 312, 346.04; 220/536, 203.23, 345.1, 348
See application file for complete search history.

(56) References Cited

U.S. PATENT DOCUMENTS

| | | | |
|---|---|---|---|
| 1,741,136 A * | 12/1929 | Naylor | A47G 23/0225 131/241 |
| 4,527,696 A * | 7/1985 | Harris | B60N 3/103 224/400 |
| 5,022,626 A * | 6/1991 | Nozel | B60N 3/101 224/926 |
| 5,590,861 A * | 1/1997 | Ardolino | A47G 23/0216 248/146 |
| 5,634,621 A * | 6/1997 | Jankovic | B60N 3/102 224/926 |
| 6,217,112 B1 | 4/2001 | Linsenmeier et al. | |
| 6,715,726 B1 * | 4/2004 | Dybalski | B60N 3/102 224/926 |
| 6,834,838 B2 | 12/2004 | Dennis et al. | |
| 7,354,086 B2 * | 4/2008 | Park | B60N 3/10 224/926 |

(Continued)

FOREIGN PATENT DOCUMENTS

| | | |
|---|---|---|
| CN | 104960453 A | 10/2015 |
| EP | 2979930 A1 | 12/2005 |

(Continued)

OTHER PUBLICATIONS

English Machine Translation of CN104960453A.

(Continued)

Primary Examiner — Terrell L McKinnon
Assistant Examiner — Michael McDuffie
(74) Attorney, Agent, or Firm — Vichit Chea; King & Schickli, PLLC

(57) ABSTRACT

A adjustable cup holder includes a base, a retainer and a biasing element. The base includes a first cup well and a second cup well, the retainer is carried on the base and is displaceable between a home position and a raised or deployed position for holding taller items in a more stable manner. The biasing element biases the retainer toward the deployed position.

14 Claims, 6 Drawing Sheets

(56) References Cited

U.S. PATENT DOCUMENTS

| | | | |
|---|---|---|---|
| 7,562,854 B2 * | 7/2009 | Bieck | B60N 3/102 224/926 |
| 7,757,888 B2 * | 7/2010 | Ogura | B60N 3/106 220/345.1 |
| 8,201,794 B1 * | 6/2012 | Pesola | A45F 3/44 248/311.2 |
| 8,382,053 B2 * | 2/2013 | Webb | A47G 23/02 248/146 |
| 8,439,438 B2 | 5/2013 | Oldani et al. | |
| 8,485,680 B2 * | 7/2013 | Anderson | B60N 3/108 224/926 |
| 9,221,581 B2 * | 12/2015 | Yokota | B65D 21/08 |
| 9,706,865 B2 | 7/2017 | Shen | |
| 9,944,209 B1 * | 4/2018 | Carnevali | B60N 3/105 |
| 2005/0224675 A1 | 10/2005 | Schaal | |
| 2005/0269471 A1 | 12/2005 | Wagner | |
| 2005/0269472 A1 * | 12/2005 | Wagner | B60N 3/102 248/311.2 |
| 2007/0119855 A1 * | 5/2007 | Ishida | B60N 3/106 220/737 |
| 2007/0252051 A1 * | 11/2007 | Kuipers | B01F 15/00733 248/146 |
| 2007/0278372 A1 * | 12/2007 | Okada | B60N 3/101 248/311.2 |
| 2009/0127420 A1 * | 5/2009 | Skaggs | B60N 3/10 248/313 |
| 2010/0193654 A1 * | 8/2010 | Mclaughlin | B60N 3/101 248/311.2 |
| 2013/0264339 A1 * | 10/2013 | Oldani | B60N 3/102 220/8 |
| 2015/0001363 A1 * | 1/2015 | Bohlke | B60N 3/106 248/311.2 |
| 2015/0353019 A1 * | 12/2015 | Skapof | B60R 7/04 248/311.2 |

FOREIGN PATENT DOCUMENTS

| | | |
|---|---|---|
| GB | 2529760 A | 3/2016 |
| JP | 2012025184 A | 2/2012 |
| KR | 2015072108 A | 6/2005 |
| KR | 100774402 B1 | 11/2007 |
| KR | 1409225 B1 | 6/2014 |
| KR | 2014091266 A | 7/2014 |
| KR | 2015032080 A | 3/2015 |
| KR | 2015072137 A | 6/2015 |
| KR | 1665247 B1 | 10/2016 |
| KR | 2016129511 A | 11/2016 |
| KR | 2017028137 A | 3/2017 |
| KR | 20170037040 A | 4/2017 |
| KR | 1737232 B1 | 5/2017 |

OTHER PUBLICATIONS

English Machine Translation of JP2012025184A.
English Machine Translation of KR100774402B1.
English Machine Translation of KR20170037040A.
English Machine Translation of KR1409225B1.
English Machine Translation of KR1665247B1.
English Machine Translation of KR1737232B1.
English Machine Translation of KR2014091266A1.
English Machine Translation of KR2015032080A.
English Machine Translation of KR2015072108A.
English Machine Translation of KR2015072137A.
English Machine Translation of KR2016129511A.
English Machine Translation of KR2017028137A.

* cited by examiner

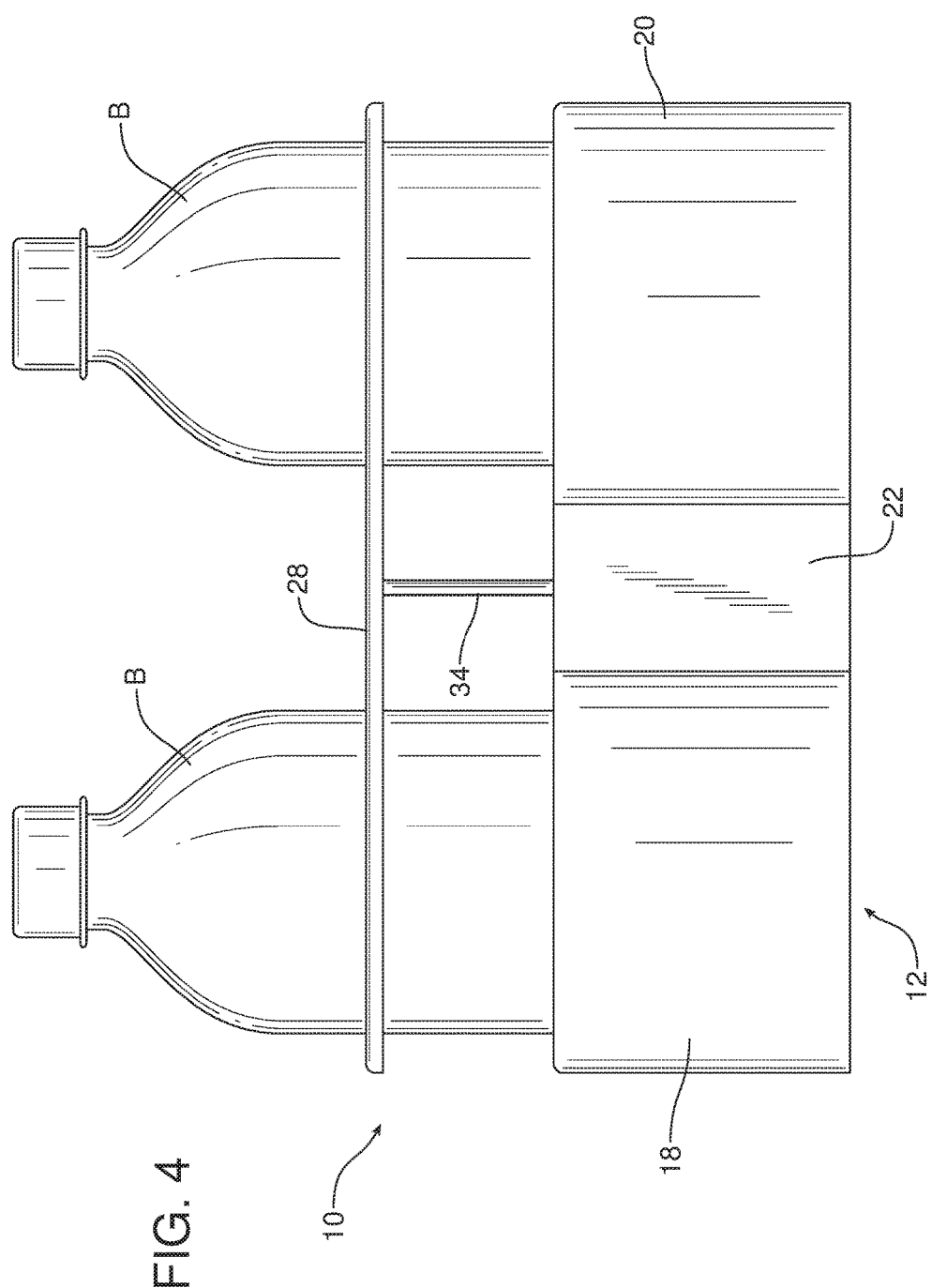

ADJUSTABLE CUP HOLDER FOR HOLDING TALL CUPS, BOTTLES AND THE LIKE

TECHNICAL FIELD

This document relates generally to the motor vehicle equipment field and, more particularly, to an adjustable cup holder particularly suited for holding tall cups, bottles and the like.

BACKGROUND

Bottles, cups and other tall objects which may be transported and used in a motor vehicle come in various sizes and geometries. This document relates to a new and improved cup holder that is adjustable so as to hold taller drink cups, drink bottles and the like in a stable manner for any foreseeable operating conditions of the motor vehicle. When adjusted, the cup holder holds tall drink cups, bottles and the like in a more stable manner thereby eliminating potential distraction of the driver and reducing and in many instances substantially eliminating any spill risk.

SUMMARY

In accordance with the purposes and benefits described herein, a new and improved adjustable cup holder is provided. That adjustable cup holder is particularly suited for relatively tall drink cups, drink bottles and the like. The adjustable cup holder comprises a base including a first cup well, a retainer carried on the base and a biasing element. The retainer is displaceable between a home position and a deployed position. The biasing element biases the retainer toward the deployed position.

The retainer may include a retention ring carried on a support. The support may include a first post and a second post. The biasing element may include a first compression spring that extends around the first post and a second compression spring that extends around the second post.

The first cup well may include a first open end. The retention ring may be located adjacent the first open end when the retainer is in the home position which is commonly utilized when the cup holder is holding shorter drink cups, drink cans, drink bottles and like items. In contrast, the retainer is raised above and positioned remote from the first open end when the retainer is in the deployed position for holding taller drink cans, drink cups, drink bottles and other tall items. In at least some of the many possible embodiments of the adjustable cup holder, the retention ring at least partially outlines the first open end.

In at least some of the many possible embodiments of the adjustable cup holder, the base may include a second cup well. That second cup well may include a second open end. In such an embodiment the retention ring may at least partially outline the second open end.

In at least some of the many possible embodiments of the adjustable cup holder, the base may include a guide track that receives the support. That guide track may include a first guideway and a second guideway. The first post may slide in the first guideway. The second post may slide in the second guideway. The first compression spring may be captured in the first guideway. The second compression spring may be captured in the second guideway.

In at least some of the many possible embodiments of the adjustable cup holder, the base may include a partition section between the first cup well and the second cup well. The guide track may be provided in the partition section of the base.

The adjustable cup holder also includes a latching mechanism that holds the retention ring against the biasing force of the compression springs in both the home position and the deployed position. The latching mechanism may include a first follower on the first post and a second follower on the second post.

In addition, the latching mechanism may include a first guide channel on the first guideway and a second guide channel on the second guideway. The two guide channels may both be continuous and may both include alternating high peaks and low peaks. The first follower slides along the first guide channel and the second follower slides along the second guide channel. As the retention ring is displaced between the home and deployed positions, the followers are displaced along the guide channels between the alternating low peaks and high peaks.

In the following description, there are shown and described several preferred embodiments of the adjustable cup holder. As it should be realized, the adjustable cup holder is capable of other, different embodiments and its several details are capable of modification in various, obvious aspects all without departing from the adjustable cup holder as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the adjustable cup holder and together with the description serve to explain certain principles thereof.

FIG. 4 is a side elevational view of the adjustable cup holder illustrating two tall drink bottles held in the two cup wells of the adjustable cup holder.

Figure 1:
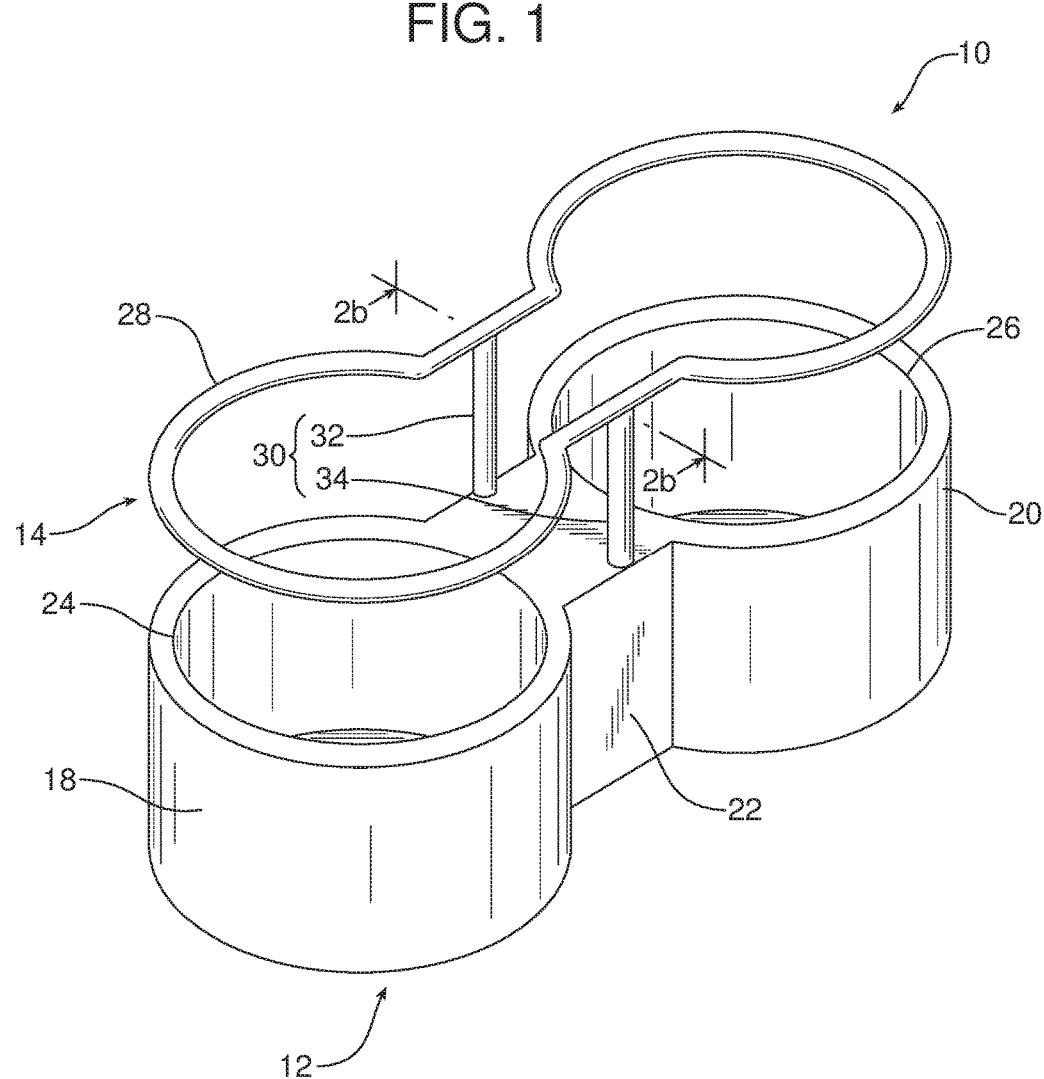
FIG. 1 is a detailed perspective view of the adjustable cup holder wherein the retainer of that adjustable cup holder is illustrated in the deployed position raised above the base of the cup holder.

Reference will now be made in detail to the present preferred embodiments of the adjustable cup holder, examples of which are illustrated in the accompanying drawing figures.

DETAILED DESCRIPTION

Reference is now made to FIGS. 1, 2a, 2b, 3a, 3b and 4 illustrating the new and improved adjustable cup holder 10. The adjustable cup holder 10 may be incorporated into a center console or trim panel of a motor vehicle. As illustrated in the drawing figures, the adjustable cup holder 10 generally includes a base 12, a retainer 14, that is carried on the base and displaceable between a lowered or home position and a raised or deployed position, and a biasing element 16 for biasing the retainer toward the deployed position.

In the illustrated embodiment, the base 12 includes a first cup well 18, a second cup well 20 and a partition section 22 between the first and second cup wells. The first cup well 20 includes a first open end 24 for receiving a cup, a can, a bottle or other item. Similarly, the second cup well 20 includes a second open end 26 for receiving a cup, a can, a bottle or other item.

The retainer 14 includes a retention ring 28 carried on a support 30. In the illustrated embodiment, the retention ring 28 at least partially outlines the first open end 24 of the first cup well 18 and the second open end 26 of the second cup well 20. The support 30 comprises two posts 32, 34. In the illustrated embodiment, the biasing element 16 comprises a first compression spring 36 that is concentrically received around or extends around the first post 32 and a second compression spring 38 that is concentrically received around or extends around the second post 34.

Figure 2A:
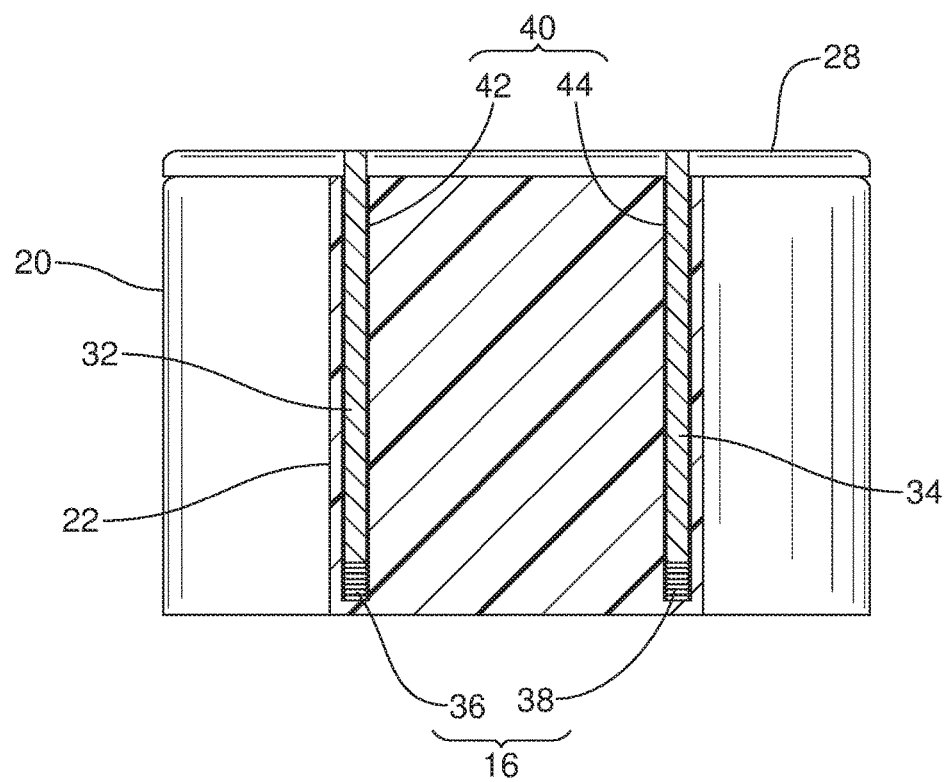
FIG. 2a is a schematic view of the adjustable cup holder in the home position wherein the retainer is lowered adjacent the top edge of the base.
Figure 2B:
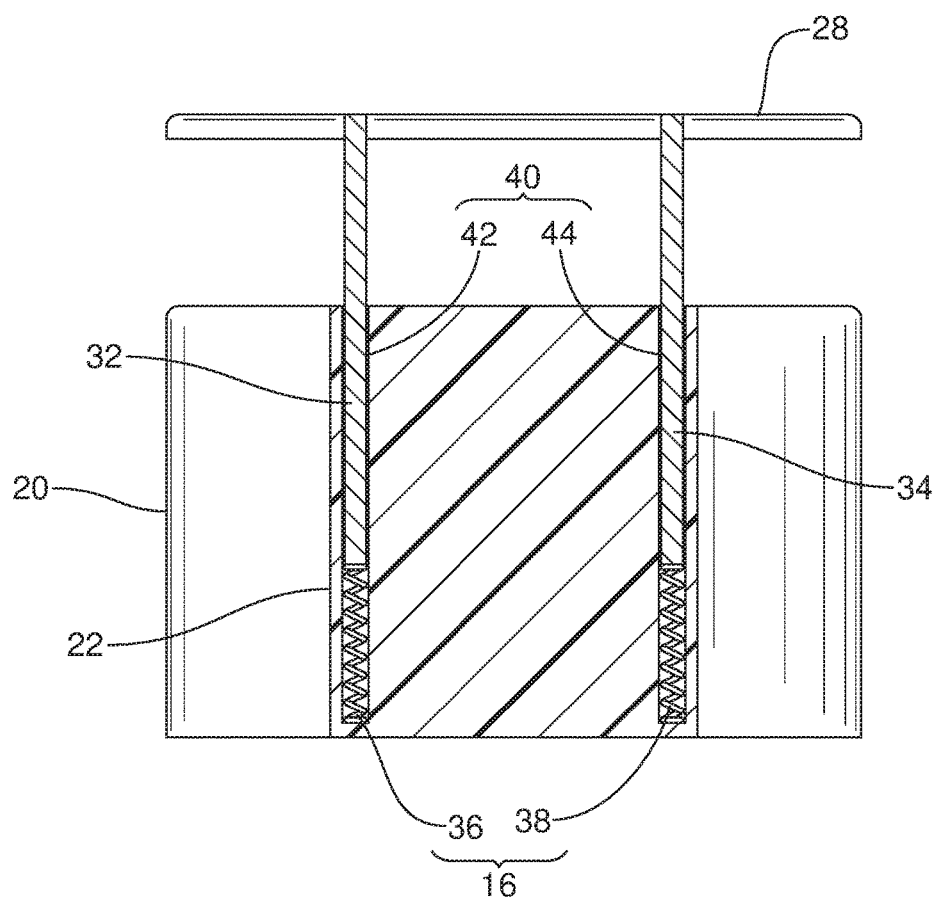
FIG. 2b is a view similar to FIG. 2a but illustrating the adjustable cup holder with the retainer in the deployed position extending above the top edge of the base.

As best illustrated in FIGS. 2a and 2b, the base 12 includes a guide track 40 that receives the posts 32, 34 of the support 30. More specifically, the guide track 40 includes a first guideway 42 and a second guideway 44. The guideways 42, 44 of the guide track 40 are provided in the partition section 22 of the base 12.

As should be appreciated, the first compression spring 36 of the biasing element 16 is captured in the first guideway 42. The second compression spring 38 of the biasing element 16 is captured in the second guideway 44. The first post 32 slides in the first guideway 42 and the second post 34 slides in the second guideway 44 when the retainer 14 is displaced between the home position illustrated in FIG. 2a and the deployed position illustrated in FIG. 2b.

As shown in FIG. 2a, the retention ring 28 of the retainer 14 is located adjacent to the top edge of the base 12 extending at least partially around the first open end 24 of the first cup well 18 and the second open end 26 of the second cup well 20 when in the home position. In contrast, when in the deployed position illustrated in FIG. 2b, the retention ring 28 of the retainer 14 is raised above and remote from the first open end 24 of the first cup well 18 and the second open end 26 of the second cup well 20. In this raised or deployed position, the retention ring 28 steadies and functions to stably hold tall drink cans, bottles B or like items (see FIG. 4).

Figure 3A:
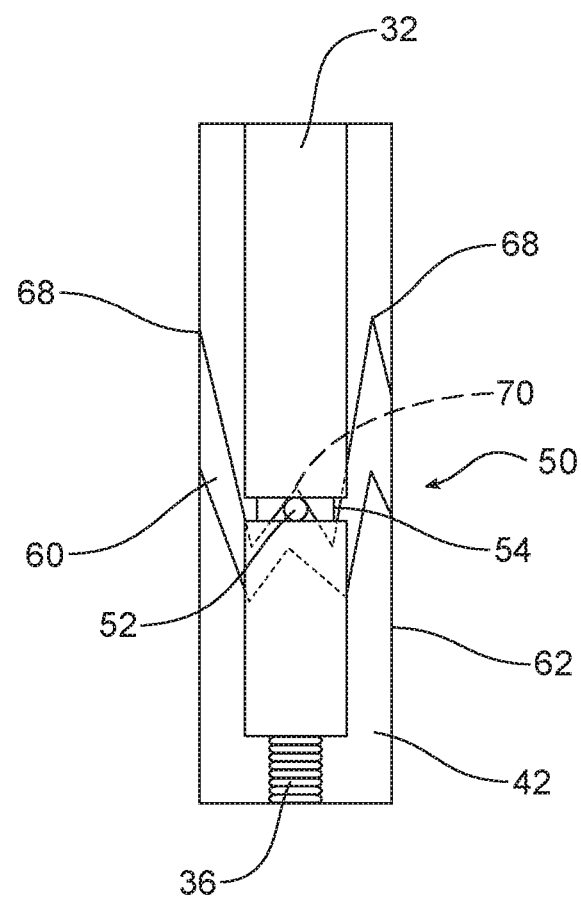
FIG. 3a is a detailed schematic view illustrating the latching mechanism of the adjustable cup holder in the home position.
Figure 3B:
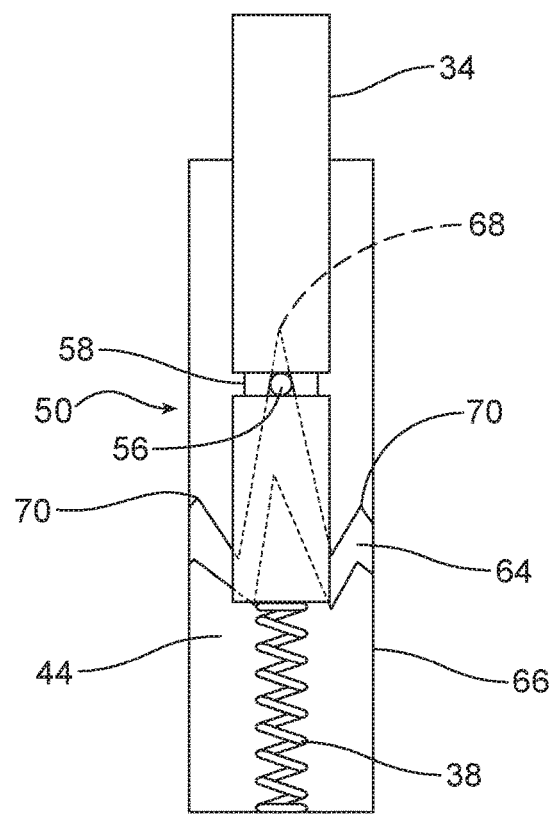
FIG. 3b is a detailed schematic view similar to FIG. 3a but showing the latching mechanism in the deployed position.

A latching mechanism, generally designated by reference numeral 50 releasably secures the retainer 14 alternately in the lowered or home position, illustrated in FIGS. 2a and 3a, and the raised or deployed position illustrated in FIGS. 2b and 3b. The latching mechanism 50 includes a first follower 52 carried in a continuous groove 54 on the first post 32 and a second follower 56 carried in a continuous groove 58 on the second post 34. The latching mechanism 50 also includes a first guide channel 60 on the wall 62 of the first guideway 42 and a second guide channel 64 on the wall 66 of the second guideway 44. Each of the two guide channels 60, 64 is a continuous path of alternating high peaks 68 and low peaks 70.

When the retention ring 28 is in the lowered, home position illustrated in FIG. 2a, the first follower 52 and the second follower 54 are held in the low peaks 66 on the respective guide channels 56, 60. See FIG. 3a. In contrast, when the retention ring 28 is in the raised, deployed position illustrated in FIG. 2b, the first follower 52 and the second follower 54 are held in high peaks 64 on the respective guide channels 56, 60.

One displaces the retention ring 28 back-and-forth between the home position and the deployed position by simply pressing down upon and then releasing the retention ring. The torque of the springs 36, 38 keeps the followers 52, 54 moving continuously through the respective channels 56, 60 between the adjacent peaks 64, 66. Thus, when the retention ring 28 is in the home position illustrated in FIGS. 2a and 3a, it is possible to displace the retention ring to the deployed position by fully depressing and releasing the retention ring. Similarly, when the retention ring 28 is in the deployed position illustrated in FIGS. 2b and 3b, it is possible to displace the retention ring to the home position by fully depressing and releasing the retention ring.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An adjustable cup holder, comprising:
   a base including a first cup well;
   a retainer carried on said base, said retainer being displaceable between a home position and a deployed position raised above said first cup well;
   a biasing element biasing said retainer toward said deployed position; and
   a latching mechanism releasably securing said retainer in said home position wherein (a) said retainer includes a retention ring carried on a support, (b) said support includes a first post and a second post, (c) said biasing element includes a first compression spring extending around said first post and a second compression spring extending around said second post and (d) said first cup well includes a first open end, said retention ring being located (i) adjacent said open end when said retainer is in said home position and (ii) remote from said first open end when said retainer is in said deployed position.

2. The adjustable cup holder of claim 1, wherein said retention ring at least partially outlines said first open end.

3. The adjustable cup holder of claim 2, wherein said base includes a second cup well.

4. The adjustable cup holder of claim 3, wherein said second cup well includes a second open end.

5. The adjustable cup holder of claim 4, wherein said retention ring at least partially outlines said second open end.

6. The adjustable cup holder of claim 5, wherein said base includes a guide track receiving said support.

7. The adjustable cup holder of claim 6, wherein said guide track includes a first guideway and a second guideway.

8. The adjustable cup holder of claim 7, wherein said first post slides in said first guideway and said second post slides in said second guideway.

9. The adjustable cup holder of claim 8, wherein said first compression spring is captured in said first guideway and said second compression spring is captured in said second guideway.

10. The adjustable cup holder of claim 9, wherein said base includes a partition section between said first cup well and said second cup well.

11. The adjustable cup holder of claim 10, wherein said guide track is provided in said partition section of said base.

12. The adjustable cup holder of claim 1, wherein said latching mechanism includes a first follower on said first post and a first guide channel on a first guideway wherein said first follower slides along said first guideway.

13. The adjustable cup holder of claim 12, wherein said first guideway includes alternating peaks.

14. The adjustable cup holder of claim 13, wherein said latching mechanism includes a second follower on said second post and a second guide channel on a second guideway wherein said second follower slides along said second guideway.

* * * * *